(12) United States Patent
Willhite et al.

(10) Patent No.: US 8,194,653 B2
(45) Date of Patent: Jun. 5, 2012

(54) DATA SWITCHING USING SOFT CONFIGURATION (75) Inventors: Nelson Willhite, Sunnyvale, CA (US);
Mike Noll, San Jose, CA (US); Robert Steven Martin, Los Gatos, CA (US);
Akhil Duggal, Los Altos, CA (US);
Craig Lindberg, Nevada City, CA (US);
Thomas Carleton Jones, San Jose, CA (US); Srinivas Komidi, San Jose, CA (US)

(73) Assignee: Alcatel Lucent, Paris (FR)

( * ) Notice: Subject to any disclaimer, the term of this patent is extended or adjusted under 35 U.S.C. 154(b) by 92 days.

(21) Appl. No.: 12/074,480

(22) Filed: Mar. 4, 2008

(65) Prior Publication Data

US 2008/0151880 A1 Jun. 26, 2008

Related U.S. Application Data (63) Continuation of application No. 10/831,628, filed on Apr. 23, 2004, now Pat. No. 7,366,166.

(60) Provisional application No. 60/465,444, filed on Apr. 25, 2003, provisional application No. 60/465,652, filed on Apr. 25, 2003.

(51) Int. Cl.
*H04L 12/50* (2006.01)
*H04L 12/28* (2006.01)
*H04L 12/56* (2006.01)

(52) U.S. Cl. ......... 370/380; 370/413; 370/414; 370/418

(58) Field of Classification Search .......... 370/412–418, 370/380
See application file for complete search history.

(56) References Cited

U.S. PATENT DOCUMENTS

| | | | |
|---|---|---|---|
| 5,422,880 A | 6/1995 | Heitkamp et al. | |
| 6,208,644 B1 * | 3/2001 | Pannell et al. | 370/389 |
| 6,608,813 B1 * | 8/2003 | Chiussi et al. | 370/218 |
| 7,023,857 B1 * | 4/2006 | Chiussi et al. | 370/395.4 |
| 2001/0005386 A1 * | 6/2001 | Sakurai et al. | 370/538 |
| 2002/0064162 A1 * | 5/2002 | Lespagnol | 370/395.71 |
| 2002/0075540 A1 * | 6/2002 | Munter | 359/128 |
| 2002/0118689 A1 * | 8/2002 | Luijten et al. | 370/411 |
| 2003/0063605 A1 * | 4/2003 | Ravi et al. | 370/389 |
| 2004/0037278 A1 * | 2/2004 | Wong et al. | 370/389 |
| 2004/0208625 A1 * | 10/2004 | Beshai et al. | 398/161 |

FOREIGN PATENT DOCUMENTS

| | | |
|---|---|---|
| JP | 11154977 | 6/1999 |
| JP | 2001075931 | 3/2001 |
| JP | 2002335272 | 11/2002 |
| JP | 2002374546 | 12/2002 |
| WO | WO 03/021341 * | 3/2003 |

* cited by examiner

*Primary Examiner* — Ronald Abelson
(74) *Attorney, Agent, or Firm* — Van Pelt, Yi & James, LLP (57) ABSTRACT

Network data switching includes receiving a cell; associating the cell with a destination port; selecting, based at least in part on a mapping of a plurality of output ports and a plurality of egress links, a selected egress link that has been soft configured to be associated with the destination port, wherein each of the plurality of egress links is configured to send data from a switch fabric to a corresponding access node; and switching the cell to the selected egress link.

23 Claims, 9 Drawing Sheets

| Ingress Link | Output Port | Egress Link |
|---|---|---|
| 11 | 1 | 13 |
| | 2 | N/A |
| | 3 | 17 |
| | 4 | N/A |
| | 5 | 19 |
| 12 | 1 | 12 |
| | 2 | 15 |
| | 3 | 16 |
| | 4 | N/A |
| | 5 | N/A |
| 13 | 1 | 11 |
| | 2 | 14 |
| | 3 | N/A |
| | 4 | 18 |
| | 5 | N/A |
| 14 | 1 | 13 |
| | 2 | 14 |
| | 3 | 17 |
| | 4 | N/A |
| | 5 | 19 |
| 15 | 1 | 12 |
| | 2 | 15 |
| | 3 | 16 |
| | 4 | 18 |
| | 5 | N/A |
| 16 | 1 | 12 |
| | 2 | 15 |
| | 3 | 17 |
| | 4 | 18 |
| | 5 | N/A |
| 17 | 1 | 11 |
| | 2 | 14 |
| | 3 | 16 |
| | 4 | N/A |
| | 5 | 19 |
| 18 | 1 | 13 |
| | 2 | 15 |
| | 3 | 16 |
| | 4 | 18 |
| | 5 | 19 |
| 19 | 1 | 11 |
| | 2 | 14 |
| | 3 | 17 |
| | 4 | 18 |
| | 5 | 19 |

FIG. 5

| Egress Link | Input Port | Ingress Link |
|---|---|---|
| 11 | 1 | 13 |
|  | 2 | N/A |
|  | 3 | 17 |
|  | 4 | N/A |
|  | 5 | 19 |
| 12 | 1 | 12 |
|  | 2 | 15 |
|  | 3 | 16 |
|  | 4 | N/A |
|  | 5 | N/A |
| 13 | 1 | 11 |
|  | 2 | 14 |
|  | 3 | N/A |
|  | 4 | 18 |
|  | 5 | N/A |
| 14 | 1 | 13 |
|  | 2 | 14 |
|  | 3 | 17 |
|  | 4 | N/A |
|  | 5 | 19 |
| 15 | 1 | 12 |
|  | 2 | 15 |
|  | 3 | 16 |
|  | 4 | 18 |
|  | 5 | N/A |
| 16 | 1 | 12 |
|  | 2 | 15 |
|  | 3 | 17 |
|  | 4 | 18 |
|  | 5 | N/A |
| 17 | 1 | 11 |
|  | 2 | 14 |
|  | 3 | 16 |
|  | 4 | N/A |
|  | 5 | 19 |
| 18 | 1 | 13 |
|  | 2 | 15 |
|  | 3 | 16 |
|  | 4 | 18 |
|  | 5 | 19 |
| 19 | 1 | 11 |
|  | 2 | 14 |
|  | 3 | 17 |
|  | 4 | 18 |
|  | 5 | 19 |

DATA SWITCHING USING SOFT CONFIGURATION

CROSS REFERENCE TO OTHER APPLICATIONS

This application is a continuation of co-pending U.S. patent application Ser. No. 10/831,628, entitled DATA SWITCHING USING SOFT CONFIGURATION filed Apr. 23, 2004 which is incorporated herein by reference for all purposes; which claims priority to U.S. Provisional Patent Application No. 60/465,444, entitled AN IMPROVED NETWORK SWITCH INTEGRATED CIRCUIT filed Apr. 25, 2003, which is incorporated herein by reference for all purposes; and U.S. Provisional Patent Application No. 60/465,652 entitled AN IMPROVED NETWORK SWITCH AND FABRIC ACCESS ARCHITECTURE filed Apr. 25, 2003, which is incorporated herein by reference for all purposes.

FIELD OF INVENTION

The present invention relates generally to data networking. More specifically, a data switching technique is disclosed.

BACKGROUND OF THE INVENTION

In data communication networks, devices such as routers or switches are often used to transfer data from a source to a destination. Some existing switching systems transfer data using switch fabrics with multiple bidirectional links by which data to be transferred may be received on an ingress link and switched to an egress link associated with a destination to which the data is being sent. These existing systems are typically configured statically, where a destination port is directly mapped to a particular egress link, in a particular physical location on the switch device. For example, a data frame addressed to "port 6" would always be switched to the same egress link on the switch device, and the same port would have the same location on every like switch device comprising the switch fabric. Limited bundling options have made it possible to associate groups of egress links with a single logical port, but the destination port typically is still directly mapped to the "bundle" of egress links. Such a configuration is inflexible, and may require complex printed circuit board (PCB) layouts and/or back plane designs that may increase production costs and hinder system performance. Furthermore, due to the static configuration constraints, the current systems typically offer limited bundling and scaling options. It would be desirable if switching systems could offer more flexible configurations and simpler physical layout. It would also be useful if the switching systems could provide more scaling options.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Network data switching is disclosed. In some embodiments, a data cell is received and associated with a destination port. An egress link that has been soft configured to be associated with the destination port is selected, and the data cell is switched to the egress link. In some embodiments, ingress links are soft configured to service source ports. The soft configuration is implemented using a mapping table or function in some embodiments. The ports may be relabeled to reconfigure the switch. The links may be bundled arbitrarily to provide greater capacity and allow more graceful failover.

In U.S. patent application Ser. No. 10/740,720, entitled SWITCH FABRIC ACCESS SCHEDULER filed Dec. 18, 2003, which is incorporated herein by reference for all purposes, the switching of data between fabric access nodes is disclosed. In some embodiments, data is switched between fabric access nodes via a switch fabric. The connection between a fabric access node and a switch is preferably a bidirectional connection that includes an ingress link configured to send data from the fabric access node to the switch fabric and an egress link configured to send data from the switch fabric to the fabric access node. In some embodiments, the unit of data transfer is referred to as a cell. Cells may have uniform lengths or varying lengths.

Figure 1:
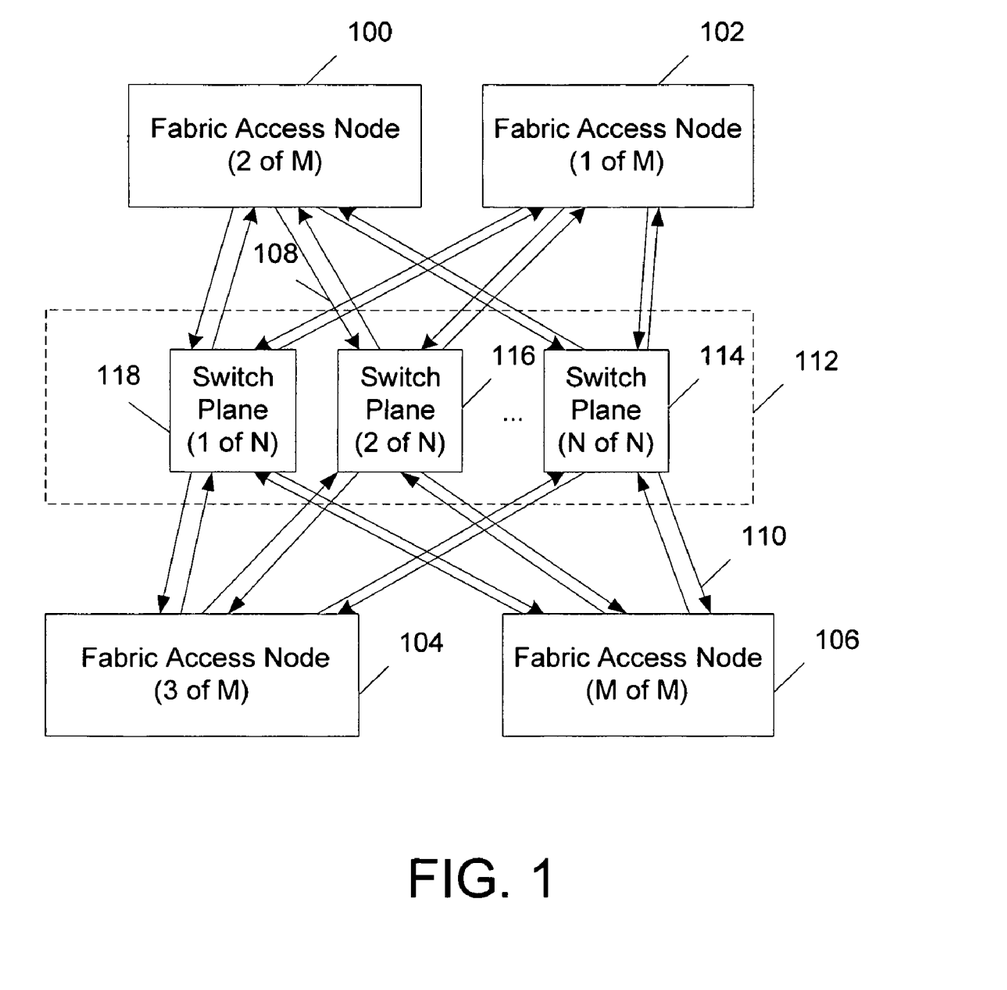
FIG. 1 is a diagram illustrating an embodiment of a switching system.

FIG. 1 is a diagram illustrating an embodiment of a switching system. In this example, a number "M" of fabric access nodes, represented in FIG. 1 by fabric access nodes 100-106, are coupled to a switch fabric 112. Switch fabric 112 includes a plurality of "N" switch planes, represented in FIG. 1 by switch planes 114-118. Each of the switch planes can switch cells independently, without requiring synchronization with other switch planes. Each switch plane may be a separate physical device, although in some embodiments one physical device, e.g., one integrated circuit, may support multiple switch planes. Each fabric access node is associated with one or more ports that are connected to the switch plane via bi-directional connections such as 108 and 110. As used herein, a port refers to a logical source or destination that can be addressed for the purposes of transferring data. A cell is transferred from a source port to a destination port via the connections. The actual number of access nodes, switch planes and the number of ports for the individual fabric access node depend on implementation and may vary for different embodiments.

Link bundling has been used to provide increased data transfer capacity for one or more ports associated with a switch device. Instead of each port having just one bidirectional connection (i.e., one ingress link/egress link pair) to the switch device, one or more ports may have multiple connections to the device. In typical prior art switch systems, however, bundling has been limited to bundles of 2, 4, 8, 16, etc., due to limitations in the architecture of typical prior art switches, in particular with respect to how destination addresses are mapped directly to egress links, as described above. In such switches, bundling typically is accomplished by ignoring one or more least significant bits (LSB) of the destination address. For example, absent bundling, the address "000" might be associated with a port "0" and a corresponding egress link "0" while address "001" might associated with a port "1" and a corresponding egress link "1". If the final (i.e., least significant) bit of every address were ignored, however, both address "000" and "001" would be read as "00", and the respective corresponding links "0" and "1" would be associated with the single logical port "0". However, because binary addresses are used, this technique can only be used to bundle links in powers of 2 (i.e., 2, 4, 8, etc.), with an additional LSB typically being ignored to effect the next level of bundling.

Figure 2:
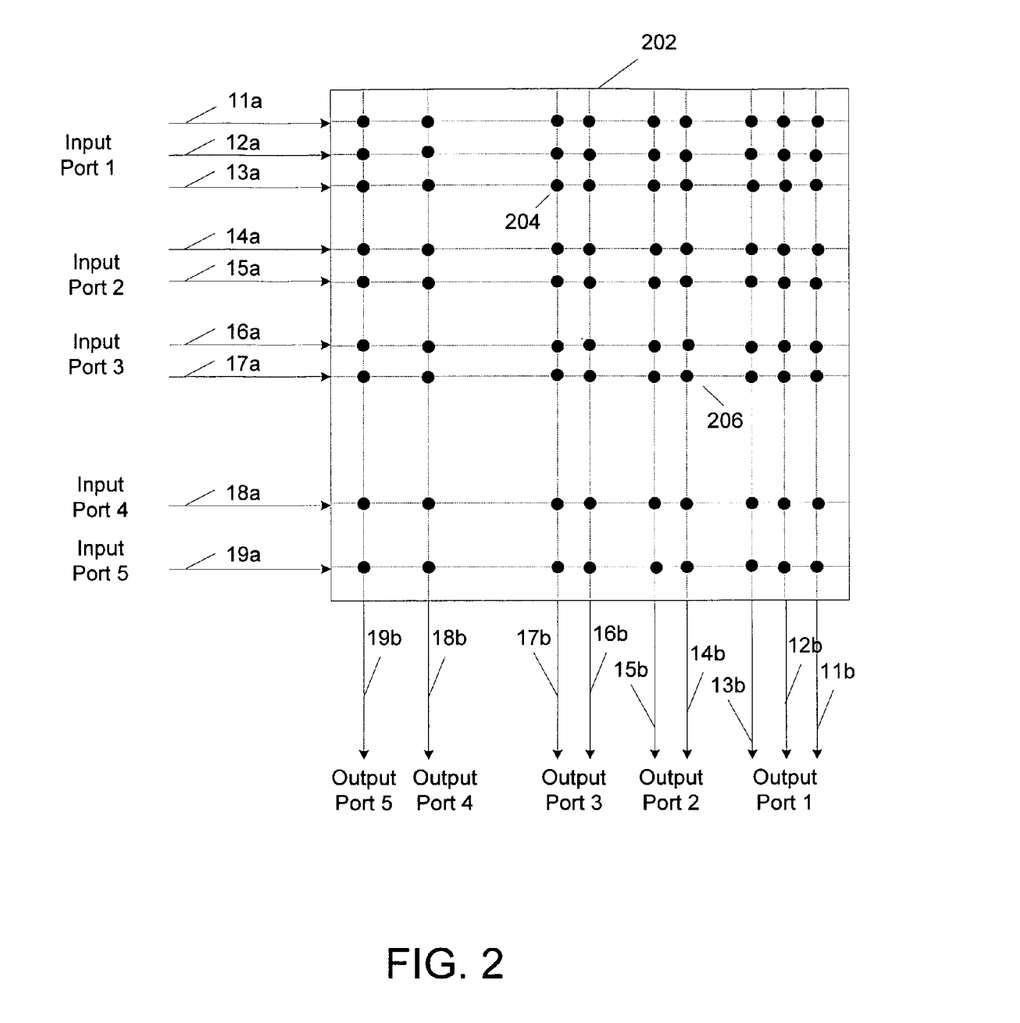
FIG. 2 illustrates how soft mapping ports to links is used in one embodiment to provide for more flexible bundling.

FIG. 2 illustrates how soft mapping ports to links is used in one embodiment to provide for more flexible bundling. In the example shown in FIG. 2, port "1" is shown as having three bidirectional links (i.e., ingress/egress link pairs 11a-11b, 12a-12b, and 13a-13b) to a switch device 202, while ports "2" and "3" each have two links and ports "4" and "5" each have just one. In FIG. 2, the switch device 202 is represented as a cross-bar structure through which data received on an ingress link may be sent to an appropriate egress link by being switched to the egress link at one of the junctions indicated by the large black dots marking the intersection points of the cross-bar, such as junctions 204 (providing a path from ingress link 13a to egress link 17b) and 206 (providing an input path from ingress link 17a to egress link 14b). When a data cell is ready to be switched from an input port to an output (destination) port, an available link from a bundle associated with a port is selected to transfer data to an egress link associated with the designated output port.

Unlike conventional designs where each input port is hardwired to an input link and each output port is hardwired to an output link, in this example, data can flow from any input link to any output link. Each of the bidirectional links 11-19 (each comprising an ingress link/egress link pair, e.g., bidirectional link 11 comprises ingress link 11a and corresponding egress link 11b, shown separately in FIG. 2 for clarity) is soft configured to be associated with a logical port. The soft configuration allows a link to be associated with any port, and allows each port to have an arbitrary number of links associated with it (from a single link up to the total number of available links). The association between a port and the link(s) configured to service the port, and the number of links associated with each port, can be reconfigured by changing a software setting, such as a table entry. Changes in the hardware connections are not required.

The soft configuration allows the junctions for connecting egress links with ingress link to be reprogrammed to obtain different path configurations. For example, input port 1 can be reprogrammed so that it is serviced by ingress links 14 and 15 instead of links 11-13. Also, while each port is shown in FIG. 2 as having a contiguous set of links associated with it, soft configuration would permit any link to be associated with any port. For example, links 11, 14, and 19 could be mapped to port 1. The reconfiguration may depend on service commitments, system requirements, PC board layout, etc.

Since each link is soft configured to be associated with a port, any arbitrary number of links can be bundled together. Also, the bundling of ports may be mixed (i.e. the number of links servicing physical port A may be different from the number of links servicing physical port B). A further advantage of soft configuring links to be associated with ports is that each of two devices, such as two CPU's, may be connected in the same way (e.g., to the same physical link) to one of two separate but like switch devices on a PCB that they share without an address conflict arising, because each CPU can be assigned its own unique logical address and that logical address can be associated with the link to which the CPU is connected. For example, if CPU A were connected to physical link 20 of switch device A and CPU B were connected to physical link 20 of switch device B, it would be possible using soft configuration as described herein for each of the CPU's to have its own unique logical address, as opposed to having the same address as would be required if link 20 mapped directly to the same hard configured port number on each of switch devices A and B.

Figure 3:
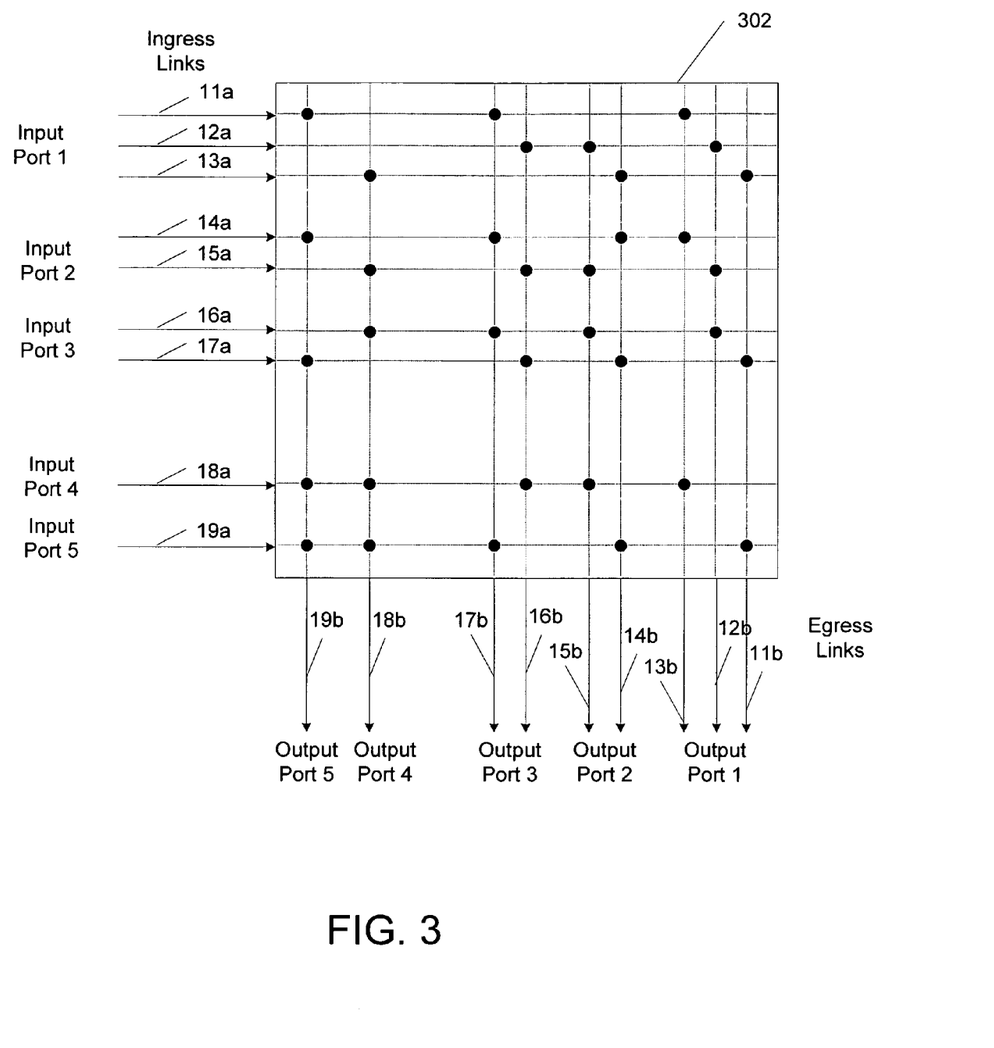
FIG. 3 illustrates an embodiment in which the number of links a port may use to send data to a particular destination via the switch device is limited to the number of links the destination port has to the switch device if the destination port has fewer links than the source port.

In the example shown in FIG. 2, each port may use any of its links to the switch device 202 to send into the switch data destined for any port. FIG. 3 illustrates an embodiment in which the number of links a port may use to send data to a particular destination via the switch device 302 is limited to the number of links the destination port has to the switch device if the destination port has fewer links than the source port. For example, input port 1 is serviced by 3 links and output port 2 is serviced by 2 links, thus the data paths between the two ports include no more than 2 pairs of links (i.e., the path from ingress link 12a to egress link 15b and the path from ingress link 13 to egress link 14). In the embodiment shown, port 1 cannot use link 111 to send data to port 2. Similarly, output port 4 is serviced by 1 link, thus the data path between input port 1 and output port 4 includes 1 pair of links (i.e., the path from ingress link 13a to egress link 18b). In the embodiment shown, port 1 can only use link 13 to send data to port 4. Although this restriction may simplify system implementation, it is not required in all systems.

In the embodiment shown in FIG. 3, each ingress link can be used to switch data to each port on at most one egress link. As a result, in the example shown it is not necessary or possible to select an egress link from among a plurality of egress links associated with the destination port associated with a cell, and instead the egress link used is determined by the destination port and the ingress link on which the cell was received, as described more fully below in connection with FIGS. 5 and 6. In other embodiments, e.g., FIG. 2, each ingress link may be configured to switch data to more than one egress link associated with a port.

Figure 4:
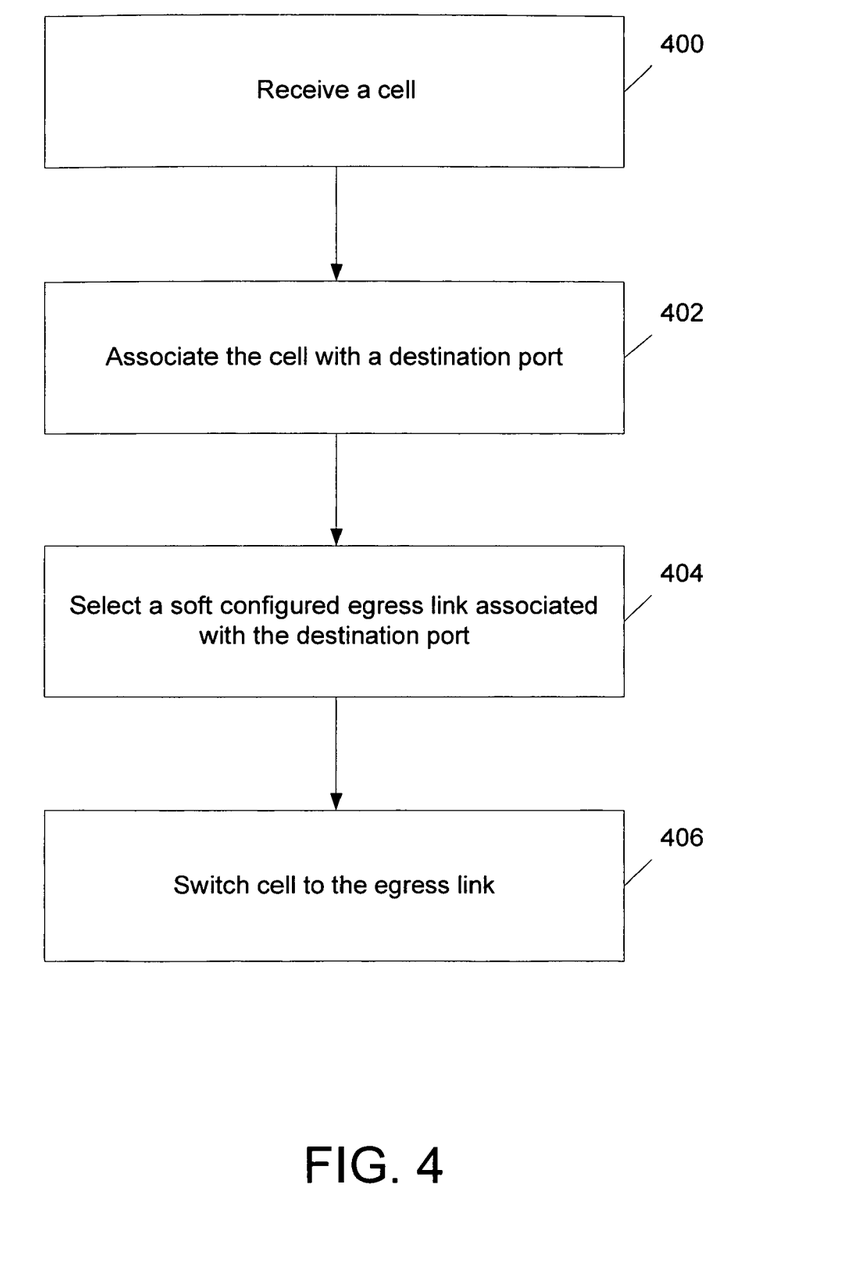
FIG. 4 is a flowchart illustrating an example of a process for switching a cell via a soft configured egress link.

FIG. 4 is a flowchart illustrating an example of a process for switching a cell via a soft configured egress link. In this example, a cell is received on an ingress link (400). An output (destination) port is associated with the cell (402). In one embodiment, destination address information associated with the cell is read and the cell is associated with an output port associated with the destination address. A soft configured egress link associated with the output (destination) port is selected (404). The cell is then switched to the selected egress link (406). The process of FIG. 4 may be used in an embodiment in which a logical port may have more than one link associated with it, as described above in connection with FIGS. 2 and 3, for example. In such an embodiment, step 404 may comprise selecting an available egress link from among one or more egress links associated with the output port. The process may be implemented in any appropriate manner, such as being embedded in a chip, processor or logic circuitry, being loaded into memory or firmware, etc.

Figure 5:
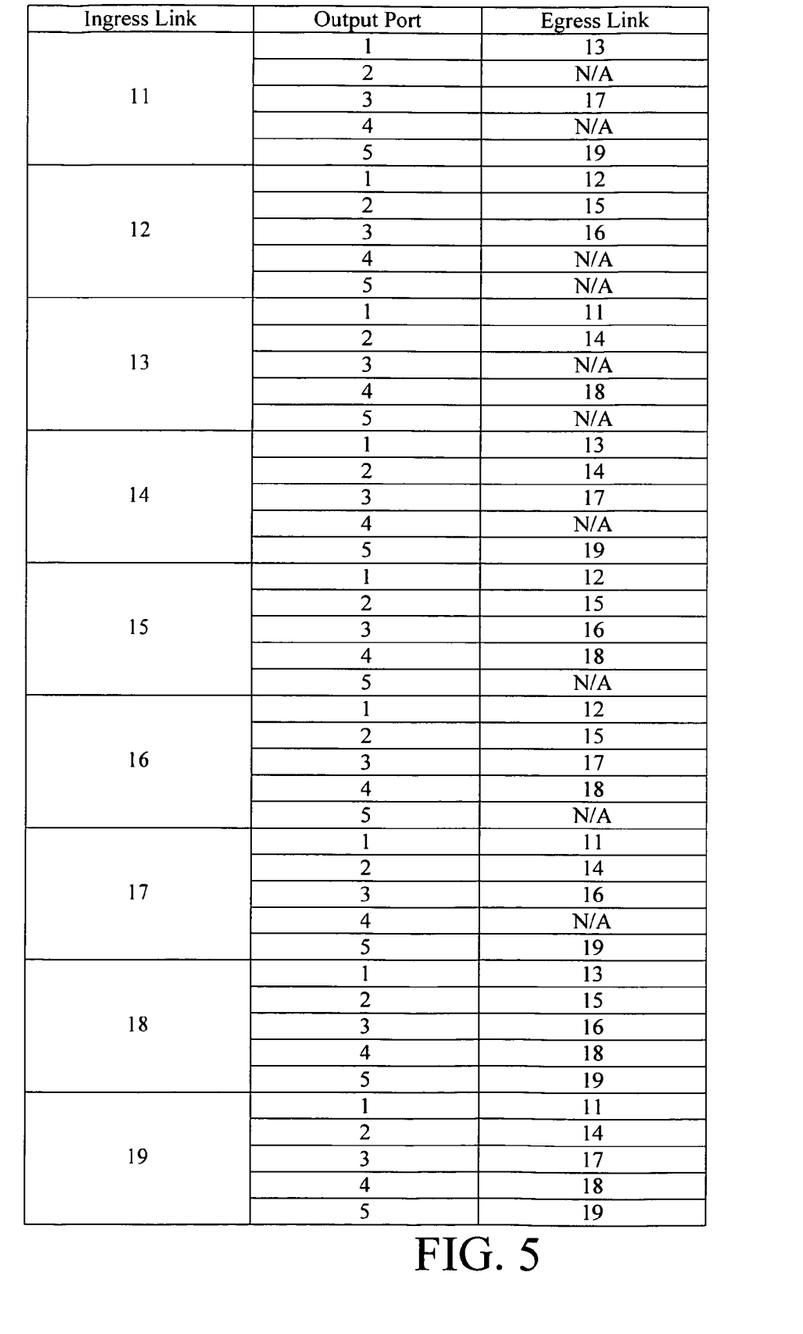
FIG. 5 illustrates a mapping table used for egress link selection, according to some embodiments.

There are various selection algorithms that can be used to select the appropriate egress link. In some embodiments, the soft configuration includes using mapping functions implemented as one or more mapping tables. FIG. 5 illustrates a mapping table used for egress link selection, according to some embodiments. For the purpose of example, the table entries shown correspond to the soft configuration shown in FIG. 3. The table allows for egress link lookup based on the ingress link and the output port of a cell. Other arrangements of the table entries may be used as well.

An input port with bundled ingress links may select one of the links to service a cell, according to a selection algorithm such as round robin, weighted round robin, etc. In some embodiments, the scheduling algorithm described in U.S. patent application Ser. No. 10/740,720 is used. Given the ingress link and the destination port, the available egress links can be determined by looking up a corresponding entry in the table shown in FIG. 5. For example, a cell received on ingress link 11 and destined for output port 1 corresponds to egress link 13 in the table. The link mapping and bundles can be reconfigured by rearranging the table entries. For example, the ports can be relabeled in order to better suit the physical configurations of the PC board layout. Note that the table in FIG. 5 has no egress link entry for output ports 2 and 4, which reflects the fact that in the embodiment shown in FIG. 3 port 1 cannot send data to either port 2 or port 4 on link 11.

In some embodiments such as the example shown in FIG. 2, multiple bundled egress links are available for servicing an output port. The selection of the appropriate egress link may be implemented in a variety of ways. For example, the available egress links corresponding to an output port may be looked up in a table. The egress link with the shortest current queue depth may be selected to service the output port.

Since links may be congested or otherwise unavailable, the availability of the links is also taken into account during the switching process in some embodiments. In some embodiments, the availability status for the links is incorporated into the egress link selection table. In some embodiments, the availability status of the links is stored in a separate mapping table and used in conjunction with the egress link selection table to select an appropriate, non-congested link.

Figure 6:
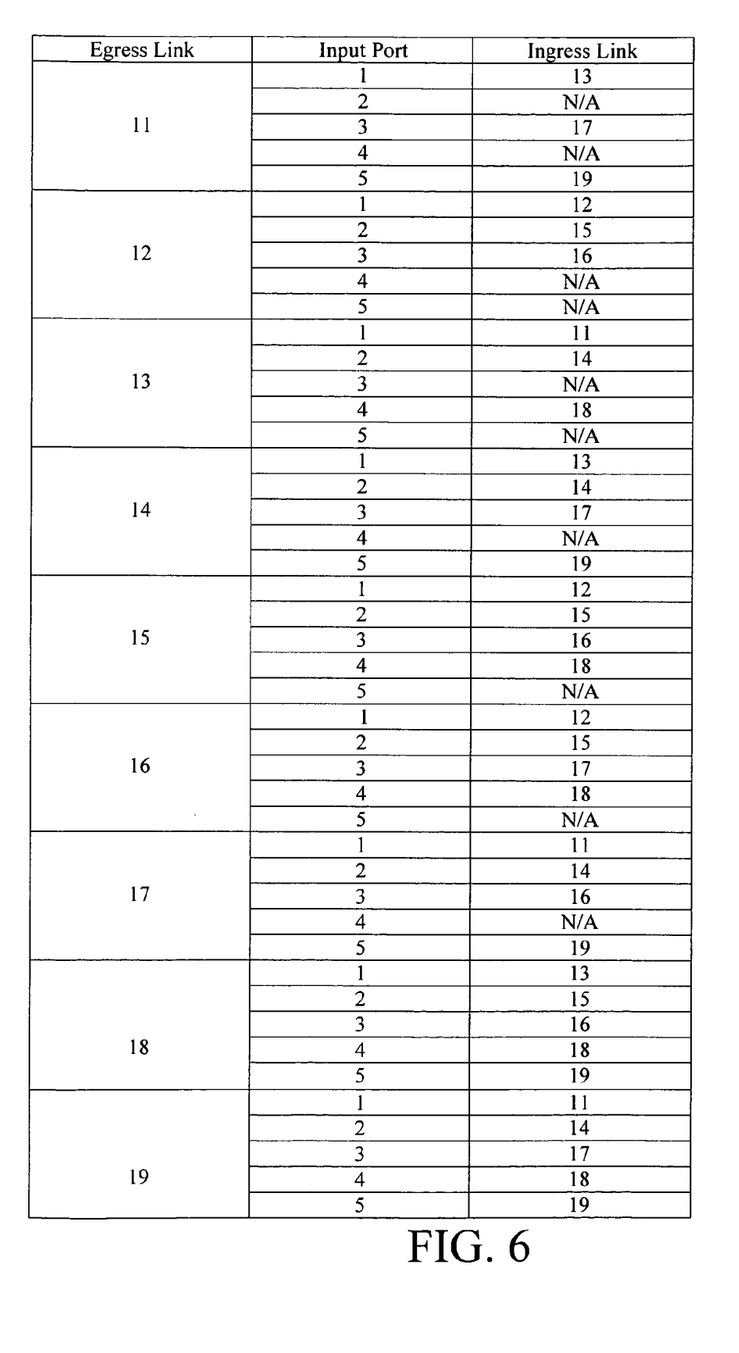
FIG. 6 illustrates a mapping table example used for determining an ingress link associated with a source port/egress link pair.

In some embodiments, based on the congestion information, flow control or backpressure information is sent to a source to stop data flow. For example, a cell reorder buffer associated with an egress link may be full, requiring that a particular source port stop sending, for the time being, data destined for the egress link. In one embodiment, a reverse mapping function is used to determine an ingress link associated with the source port to which it is necessary to propagate the backpressure information. In some embodiments, the function is implemented as a table. FIG. 6 illustrates a mapping table example used for determining an ingress link associated with a source port/egress link pair. The entries of table 600 correspond to the soft configuration shown in FIG. 3. Given the egress link and the input (source) port, the ingress link can be looked up in the table. For example, if it becomes necessary to send backpressure information to input port 1 with respect to egress link 13, the corresponding ingress link is determined to be 11 according to the table. Backpressure information can then be sent to port 1 to inform port 1 not to send on link 11 data destined for the output (destination) port associated with link 13. In one embodiment, port 1 could continue to send data to the port associated with link 13 (which in this case happens to be itself) via other available paths, e.g., link 12 or link 13. If egress link 13 were to fail and therefore become unavailable to handle data from any source, input ports 1, 2 and 4 would receive backpressure information and stop sending data designated for output port 1 on ingress links 11, 14 and 18, respectively. However, data could continue to be switched to output port 1 via other links. For example, input port 1 could continue to switch data to output port 1 via ingress link 12 and egress link 12, as well as ingress link 13 and egress link 11. Thus, in the event of link failures, the connectivity of the system degrades in an approximately linear fashion and proportionally with respect to the number of failed links.

In some embodiments, as the cell traverses the switch fabric, the switch fabric is responsible for filling in information regarding the logical source of a cell. A mapping table that allows the look up of a source port based on an ingress link number may be employed to supply the source information.

The physical implementation of the switch modules and the fabric access nodes may include integrated circuit chips, logic circuits, processors, or other appropriate devices. A fabric access node may include one or more destination-specific queues used to buffer data to be sent into the switch fabric by the fabric access node via one of the fabric access nodes links into the switch fabric. In some embodiments, the fabric access node links are soft configured using mapping registers associated with the destination queues. The mapping registers describe which links may be used to reach the respective destinations associated with the respective queues. In some embodiments, if any of the links fails, the remaining links will continue to function automatically without requiring software intervention.

The soft configuration of links allows systems of different scales to be implemented using similar basic building blocks. In some embodiments, these basic building blocks include devices such as fabric access nodes and switch modules. Because of the soft configuration, the physical switch modules (e.g., integrated circuits) may be "virtualized" to provide two or more independent virtual switch planes. In other words, a single switch module may include several switch planes that operate independently, as if they were separate physical devices. Virtualization allows the system to have greater flexibility in scaling.

Figure 7A:
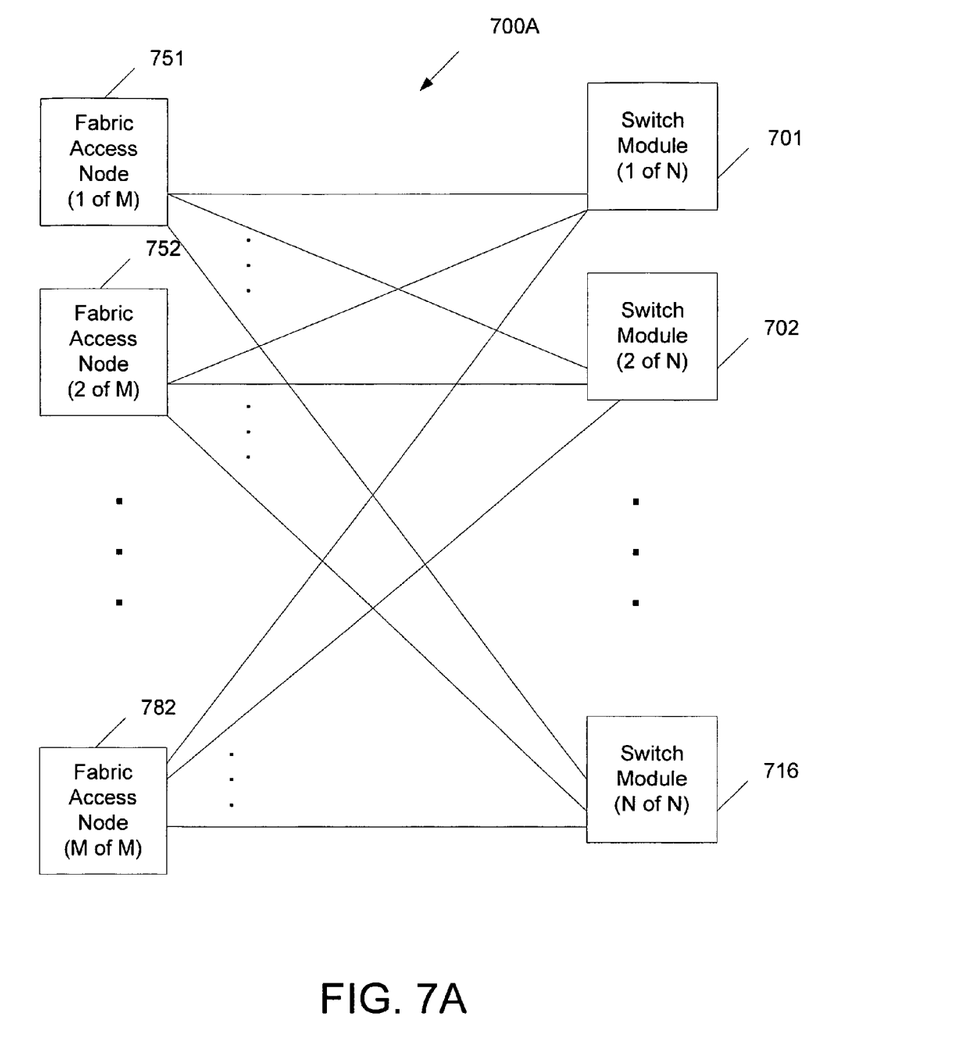
FIG. 7A is a diagram illustrating a large scale system example.
Figure 7B:
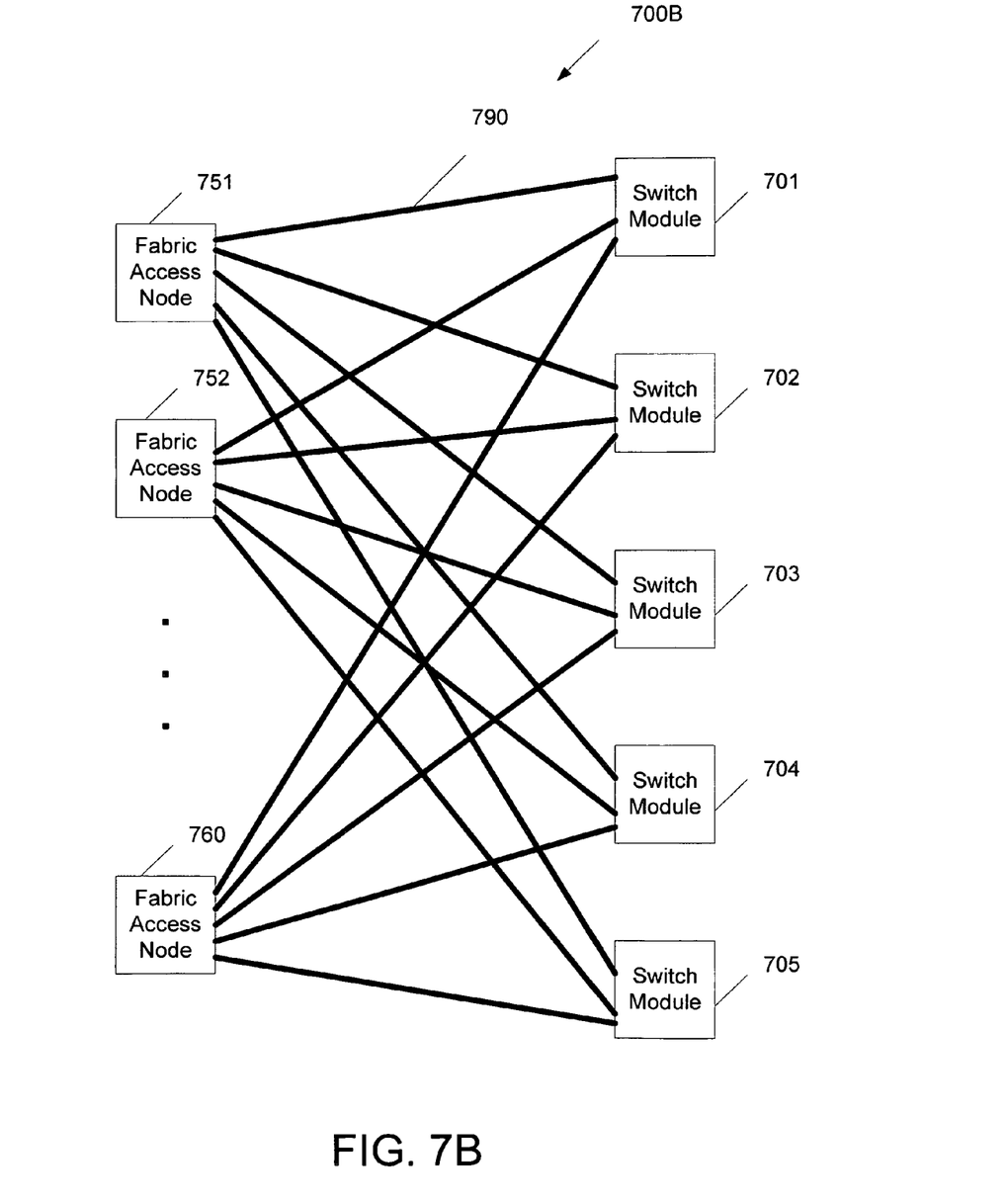
FIG. 7B is a diagram illustrating a medium scale system example.
Figure 7C:
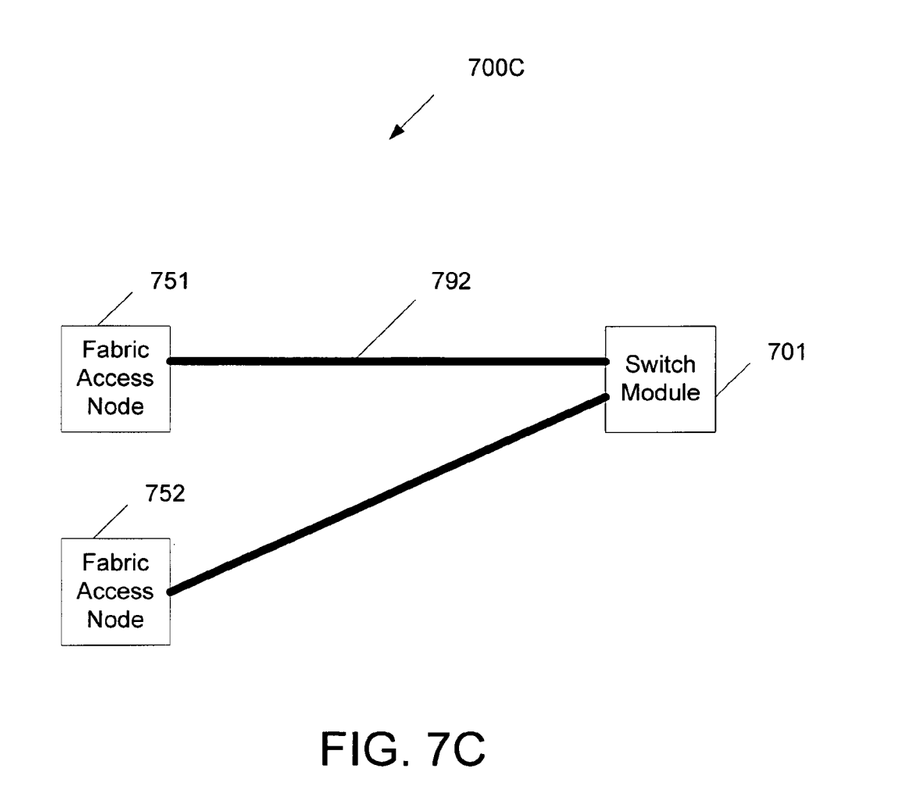
FIG. 7C is a diagram illustrating a small scale system example.

Several example systems with varying physical scale are shown in FIGS. 7A-7C. FIG. 7A is a diagram illustrating a large scale system example. In this example, system 700A includes N switch modules (represented in FIG. 7A by switch modules 701-716) each of which supports up to M connections (ports). The system further includes M fabric access nodes (represented by fabric access nodes 751-782) that each supports up to N connections. In the example shown, each fabric access node is connected by one link to each of N switch modules, each of which has one link to each of the M fabric access nodes (ports), providing high capacity and redundancy. In one embodiment, the system of FIG. 7A comprises 32 fabric access nodes (ports) each having one link to each of 16 switch modules.

FIG. 7B is a diagram illustrating a medium scale system example. In this example, system 700B includes 10 fabric access nodes (751-760) each configured to have a maximum of 16 links into the switch fabric and 5 switch modules (701-705) each having 32 links available. In the example shown, each of the fabric access nodes utilizes 15 of its connections, with each fabric access node having 3 connections to each switch module. (Each of the thick lines such as 790 in FIG. 7B represents three connections.) Each of the switch modules receives 3 connections from each of the 10 fabric access nodes. Such a system supports 5 ports with 15 connections per port. As compared to the full scale example described above in connection with FIG. 7A, fewer ports are provided (5 versus 32), but each port has nearly the same capacity (15 connections into the switch fabric, as compared to 16 in FIG. 7A) and only 5 switch modules are used (as compared to 16 in the full scale example above).

FIG. 7C is a diagram illustrating a small scale system example. In this example, system 700C includes 2 fabric access nodes (751 and 752) and 1 switch module 701. Each of the fabric access nodes utilizes all 16 of its connections and connects to the switch module. Each of the thick lines such as line 792 of FIG. 7C represents 16 connections. Such a system supports 2 ports with 16 connections per port.

In the above examples, the number of components as well as the number of links and ports supported by the components are selected for the purposes of illustration. The numbers and their combinations may vary for different implementations. In some embodiments, a meshed switching fabric is supported using fabric access nodes without the switch modules, e.g., by connecting two fabric access nodes to each other.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network switch comprising:
a plurality of input ports each associated with a plurality of ingress links, the ingress links each configured to receive a cell;
a plurality of output ports each soft configured to be associated with a subset of one or more egress links selected from a plurality of egress links, where a subset of one or more egress links associated with an output port can be any combination of egress links selected from the plurality of egress links; and
a switch circuit coupled to at least a subset of the ingress links and configured to:
associate the cell with a destination output port among the output ports;
select, based at least in part on a stored mapping of the output ports and egress links, an egress link of the destination output port for association with an ingress link of an input port among the input ports, the selecting being independent of any other selections or associations of ingress links with egress links, wherein each of the egress links is configured to send data from a switch fabric to a corresponding access node; and
switch the cell to the egress link.

2. The network switch of claim 1, wherein the mapping of the plurality of output ports and the plurality of egress links are stored in a mapping table, and selecting the egress link includes performing a look up in the mapping table.

3. The network switch of claim 1, wherein the plurality of egress links are physical links.

4. The network switch of claim 1, wherein the switch circuit is further configured to select an ingress link that has been soft configured to service a source port associated with the cell.

5. The network switch of claim 1, wherein the mapping further maps the plurality of ingress links to the plurality of output ports.

6. The network switch of claim 1, wherein the destination port comprises a first destination port and the selected egress link reconfigurable to be associated with a destination port other than the first destination port.

7. The network switch of claim 1, wherein the destination port is a first destination port, and the egress link is reconfigurable to be associated with a destination port other than the first destination port by changing a mapping table entry.

8. The network switch of claim 1, wherein at least some of the plurality of egress links are bundled to service the destination port.

9. The network switch of claim 1, wherein the switch circuit is further configured to associate the selected egress link with the destination port.

10. The network switch of claim 1, wherein the switch circuit is further configured to associate an arbitrary number of egress links, including the selected egress link, with the destination port.

11. The network switch of claim 10, wherein the switch circuit is further configured to receive an indication that one of said arbitrary number of egress links has become unavailable and continue to use the remaining available ones of said arbitrary number of egress links to send data to the destination port.

12. The network switch of claim 10, wherein said arbitrary number of egress links comprise a subset of the egress links available on a switch device, each of said arbitrary number of egress links has a corresponding ingress link, each egress link/ingress link pair comprises a bidirectional connection from a fabric access node to the switch device, and each of said arbitrary number of egress links is associated with a switch plane that is independent of the respective switch planes associated with each of the other of said arbitrary number of egress links;
whereby the switch device is virtualized to provide to the fabric access node an arbitrary number of switch planes.

13. The network switch of claim 1, wherein:
there is a maximum number of available links;
the egress link is one of a number of bundled links that have been bundled to service the destination port;
and the number of bundled links may be soft configured to be any arbitrary number between 1 and the maximum number.

14. The network switch of claim 1, wherein the egress link is one of a plurality of links that have been bundled to service the destination port and the plurality of links are configured by applying a mapping function.

15. The network switch of claim 14, wherein the mapping function comprises a table.

16. The network switch of claim 1, wherein the switch circuit is further configured to receive an indication that the egress link is unavailable.

17. The network switch of claim 16, wherein the switch circuit is further configured to send back pressure to a source of the cell.

18. The network switch of claim 17, wherein the backpressure indicates to the source that further data should not be sent to the egress link.

19. A method of switching network data, comprising:
receiving a cell;
associating the cell with a destination output port;
selecting, based at least in part on a stored mapping of a plurality of output ports and a plurality of egress links, an egress link from a plurality of egress links associated with the destination output port for association with an ingress link of an input port among a plurality of ingress links of the input port, the selecting being independent of any other selections or associations of ingress links with egress links, wherein each of the egress links is configured to send data from a switch fabric to a corresponding access node;
wherein each of the plurality of output ports is soft configured to be associated with a subset of one or more egress links selected from the plurality of egress links, where a subset of one or more egress links associated with an output port can be any combination of egress of links selected form the plurality of egress links; and
switching the cell to the selected egress link;
wherein the mapping can be changed by relabeling the destination port.

20. A computer program product for switching network data, the computer program product being embodied in a computer readable medium and comprising computer instructions for:
receiving a cell;
associating the cell with a destination output port;
selecting, based at least in part on a stored mapping of a plurality of output ports and a plurality of egress links, an egress link from a plurality of egress links associated with the destination output port for association with an ingress link of an input port among a plurality of ingress links of the input port, the selecting being independent of any other selections or associations of ingress links with egress links, wherein each of the egress links is configured to send data from a switch fabric to a corresponding access node;
wherein each of the plurality of output ports is soft configured to be associated with a subset of one or more egress links selected from the plurality of egress links, where a subset of one or more egress links associated with an output port can be any combination of egress of links selected form the plurality of egress links; and
switching the cell to the selected egress link;
wherein the mapping can be changed by relabeling the destination port.

21. The network switch of claim 1, further comprising:
a first input port among the input ports;
a first output port among the output ports; and
a second output port among the output ports,
wherein the selecting includes selecting a first ingress link of the first input port for association with an egress link of the first output port, and selecting a second ingress link of the first input port for association with an egress link of the second output port.

22. The method of claim 19, the selecting further comprising:
selecting a first ingress link of a first input port among the input ports for association with an egress link of a first output port among the output ports; and
selecting a second ingress link of the first input port for association with an egress link of a second output port among the output ports.

23. The computer program product of claim 20, the selecting further comprising:
selecting a first ingress link of a first input port among the input ports for association with an egress link of a first output port among the output ports; and
selecting a second ingress link of the first input port for association with an egress link of a second output port among the output ports.

* * * * *